G. W. LEWIS.

WRINGER.

APPLICATION FILED AUG. 10, 1916.

Reissued July 8, 1919.

14,683.

Witness

Inventor

George W. Lewis

By W. R. Lond

Attorney

UNITED STATES PATENT OFFICE.

GEORGE W. LEWIS, OF GRINNELL, IOWA, ASSIGNOR, BY MESNE ASSIGNMENTS, TO LOVELL MANUFACTURING COMPANY, OF ERIE, PENNSYLVANIA, A CORPORATION OF PENNSYLVANIA.

WRINGER.

14,683. Specification of Reissued Letters Patent. Reissued July 8, 1919.

Original No. 1,107,676, dated August 18, 1914, Serial No. 721,308, filed September 19, 1912. Application for reissue filed August 10, 1916. Serial No. 114,288

*To all whom it may concern:*

Be it known that I, GEORGE W. LEWIS, a citizen of the United States, and a resident of Grinnell, in the county of Poweshiek and State of Iowa, have invented new and useful Improvements in Wringers, of which the following is a specification.

This invention relates to clothes wringers and consists in certain improvements in the construction thereof as will be hereinafter fully described and pointed out in the claims.

The object of the invention is to provide a wringer of simple construction, provided with mechanism which may be easily and quickly operated for releasing the pressure on the wringer rolls.

More particularly it is my object to provide a wringer provided with yielding means for holding the wringer rolls together and with mechanism which is easily operated and readily accessible, whereby pressure on the wringer rolls may be immediately released.

My invention consists in certain details, in the construction, arrangement and combination of the various parts of the device whereby the objects contemplated are attained, as hereinafter more fully set forth, pointed out in my claims and illustrated in the accompanying drawings, in which:

Figure 1:
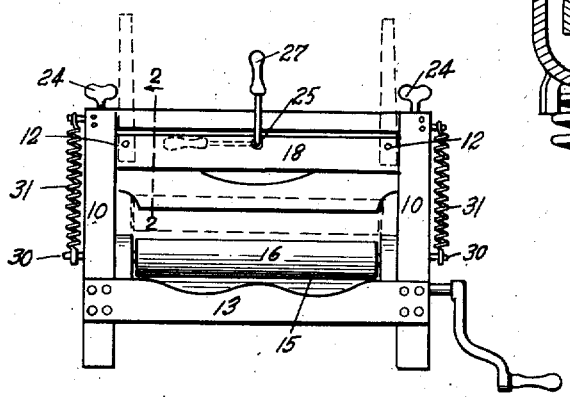
Figure 1 shows a front elevation of the wringer embodying my invention, the dotted lines showing the position of the top frame members when opened.

In the accompanying drawings I have used the reference number 10 to indicate the upright frame members at the end of the wringer. The upright members 10 may be of any suitable construction. On each side of the frame members 10, near the lower end thereof, I provide horizontal braces or cross bars 13. Mounted between the lower ends of the members 10, are a pair of rolls 15 and 16. The shafts of the wringer rolls extend into the members 10. The upper roll 16 is capable of vertical movement with relation to the end members 10. In the members 10 above the ends of the wringer roll shafts are powerful, extensible coil springs 17. Above the springs 17 a U-shaped channel bar 18, is mounted between the members 10. The channel bar 18 is designed to slide freely up and down between the members 10 and its ends extend into said members and are ordinarily supported by the spring 17.

Figure 4:
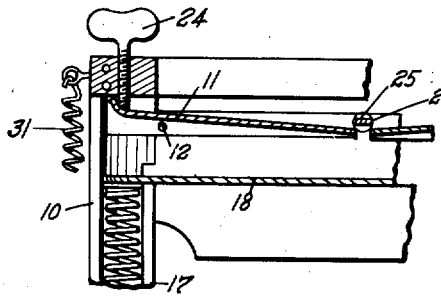
Fig. 4 shows a detail sectional view of one of the releasable arms and the adjacent mechanism.
Figure 2:
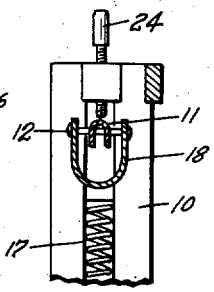
Fig. 2 shows a sectional view shown on the line 2—2 of Fig. 1.

Pivotally mounted within the channel bar 18, near each end thereof is an arm 11. The pivotal point 12 of each arm 11 is near the upright member 10, and is between the thumb screw and the catch device hereinafter described. The outer ends of the upper surfaces of the arms 11 are preferably curved upwardly as shown in Fig. 4. Mounted in the frame of the wringer, above the outer ends of the arms 11 are thumb screws 24, the lower ends of which are designed to engage said outer ends. The arms 11 are designed to swing from horizontal position within the channel bar 18 to vertical position as shown in the dotted lines in Fig. 1. When the arms 11 are in horizontal position across the top of the wringer, the screws 24 may be screwed downwardly and the tension of the springs 17 increased. The tendency of said springs then is to press upwardly on the channel bar 18 and thereby to move the channel bar 18 upwardly.

Figure 3:
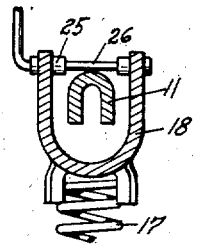
Fig. 3 shows a sectional, detailed view of part of the device.

For holding the arms 11 in their closed or horizontal position, I have provided the following means: Extending across and rotatably mounted in the sides of the channel bar 18 is a rod 25 which between the sides of said channel bar 18 is flattened on opposite sides, as shown in Fig. 3, to form a catch member 26. On one end of the rod 25 is a handle 27 extending at right angles to the rod 25. The catch device 26 and the handle 27 are so constructed and arranged that when the handle 27 stands in vertical position the flat sides of the catch device lie in horizontal planes, and when the handle 27 is in a horizontal position the flat sides of said catch device are in vertical planes. The arms 11 are of such length that they do not quite touch each other when in horizontal position. The catch device 26 is so located as to be between the inner ends of the arms 11 when in their lowered or horizontal position. When the flat sides of the catch device 26 are in vertical planes, the inner ends of the arms 11 will pass said catch device. When said ends are below the catch device the handle 27 may be moved to vertical position thereby turning the catch device till the flat sides thereof lie in horizontal planes. The inner ends of the arms 11 cannot then pass said catch device but will be held down as shown in Fig. 4. The shaft 30 of the upper wringer roll extends through the end members 10, and secured to each outer end thereof is a contractible coil spring 31 the upper end of which is secured to the frame member 10. When the arms 11 are released the springs 31 raise the wringer roll 16 entirely away from engagement with the roll 15.

In the practical operation of my improved wringer, the parts being installed, the arms 11 are moved to their horizontal position. The thumb screws 24 are then operated to move the outer ends of the arms downwardly, and thus force the channel 18 downwardly to thereby impart the tension desired to the springs 17. The wringer rolls 15 and 16 may thereby be held as tightly as desired. The arms 11 are held in their horizontal position by means of the catch device 26 which is controlled by the handle 27. Should the operator of a wringer catch his hand between the rolls, or in case any large object is drawn between the rolls, the pressure thereon may be instantly and almost completely released by moving the handle 27 from vertical to horizontal position and permitting the inner ends of the arms 11 to fly upwardly. The channel bar 18 could then slide upward and the tension on the springs 17 would be relieved.

The tension applying mechanism operates through the swinging arms 11 and the U-shaped channel bar 18, the whole forming a transversely breakable tension applying bar, which is broken when the ends of the arms 11 are released by the vertically swinging movement of the arms 11. The U-shaped bar 18 forms a connecting piece between the arms 11. The arms 11 are pivotally mounted on this connecting piece and are held normally rigidly in alinement by the catch device 26. The pressure of the spring 17 should be exerted on the arms 11 at a point off-set and preferably inside of the point of engagement with the screws 24 so that the pressure of this spring will throw the arms 11 upwardly when their adjacent ends are released by the catch mechanism 26. I prefer that this pressure be exerted through the U bar 18 by extending the U bar outwardly beyond the pivots 12 and into engagement with the springs but I do not wish to be limited in the broader phases of my invention to a structure in which the pressure is exerted on the arms 11 through the U bar.

It will be seen that my improved wringer may be used for operation by hand or by power. Many variations may be made in the details of its construction without departing from its essential features as defined in the appended claims.

What I claim as new is:—

1. In a clothes wringer, a frame, tension controlled rolls therein separable when the tension is released, a transversely breakable tension applying bar, and an emergency release for breaking the bar.

2. In a clothes wringer, a frame, tension controlled rolls therein, separable when the tension is released, a transversely breakable tension applying bar, means for adjusting the roll tension when said bar is in normal position, and an emergency release for breaking the bar.

3. In a clothes wringer, the combination of a frame; tension controlled rolls therein separable when the tension is released; a transversely breakable tension applying bar formed with arms, each having a pivotal connection with a connecting piece, said pivotal connections permitting the arms to move vertically when released; and a catch normally holding the meeting ends of said arms rigidly in alinement and permitting when released the breaking of said bar by the pivotal swinging of said arms to relieve the tension on said rolls.

4. In a clothes wringer, the combination of a frame; tension controlled rolls therein separable when the tension is released; a transversely breakable tension applying bar formed with arms, each having a pivotal connection with a connecting piece and exerting pressure through said piece on said rolls, said pivotal connections permitting the arms to move vertically when released; and a catch normally holding the meeting ends of said arms rigidly in alinement and permitting when released the breaking of said bar by the pivotal swinging of said arms to relieve the tension on said rolls.

5. In a clothes wringer, the combination of a frame including upright members; wringer rolls mounted in said members; springs exerting pressure on said rolls; a transversely breakable tension applying bar exerting pressure on said springs, said bar comprising swinging arms pivotally connected to a connecting piece, said connecting piece having extensions outside the pivots extending into said frame and onto said springs; and a catch operating on the meeting ends of said arms, holding them normally rigidly in alinement and permitting, when released, the transverse breaking of said arms to release the tension on said springs.

6. In a clothes wringer, the combination of a frame including upright members; wringer rolls mounted in said members;

springs exerting pressure on said rolls; a transversely breakable tension applying bar exerting pressure on said springs, said bar comprising swinging arms pivotally connected to a connecting piece, said connecting piece having extensions outside the pivots extending into said frame and onto said springs; a catch operating on the meeting ends of said arms, holding them normally rigidly in alinement and permitting, when released, the transverse breaking of said arms to release the tension on said springs; and screws for adjusting the tension on the springs operating on the outer ends of said arms.

7. In a device of the class described, a frame including upright end members, a pair of shafts, wringer rolls mounted thereon, said shafts being mounted on said end members, a vertically movable member slidably mounted on said end members, tension devices for pressing one of said rolls against the other, arms pivoted near the outer ends of said vertically movable member, designed to swing from horizontal to substantially vertical position, said arms being designed to be in line with and spaced from each other when in their lower position and in said position to hold said vertically movable member in position, and means for locking said pivoted arms in their horizontal position, said means comprising a rod pivoted in said vertically movable member, having opposite flat sides so that in one position of its movement the ends of said pivoted arms may swing past it, while in another position they cannot, a handle on said rod and means for exerting yielding pressure for raising said upper wringer roll.

8. In a device of the class described, a frame including upright end members, a pair of shafts, wringer rolls mounted thereon, said shafts being mounted on said end members, a vertically movable member slidably mounted on said end members, tension devices for pressing one of said rolls against the other, arms pivoted near the outer ends of said vertically movable member, designed to swing from horizontal to substantially vertical position, said arms being designed to be in line with and spaced from each other when in their lower position and in said position to hold said vertically movable member in position, and instantly releasable means for locking both of said pivoted members in their horizontal position.

In testimony whereof I have hereunto set my hand.

GEORGE W. LEWIS.